United States Patent
Li et al.

(10) Patent No.: US 10,664,650 B2
(45) Date of Patent: May 26, 2020

(54) SLIDE TAGGING AND FILTERING

(71) Applicant: Microsoft Technology Licensing, LLC, Redmond, WA (US)

(72) Inventors: David Shangni Li, Bellevue, WA (US); Eric Ouyang, Seattle, WA (US); Daniel A. Swett, Mountain View, CA (US); Kelly R. Berman, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/901,557

(22) Filed: Feb. 21, 2018

(65) Prior Publication Data
US 2019/0258706 A1    Aug. 22, 2019

(51) Int. Cl.
*G06F 17/00* (2019.01)
*G06F 40/169* (2020.01)
*G06F 3/0482* (2013.01)
*G06F 3/0483* (2013.01)
*G06F 16/438* (2019.01)

(52) U.S. Cl.
CPC .......... *G06F 40/169* (2020.01); *G06F 3/0482* (2013.01); *G06F 3/0483* (2013.01); *G06F 16/4393* (2019.01)

(58) Field of Classification Search
CPC ..... G06F 17/241; G06F 3/0482; G06F 3/0483
USPC ....................................................... 715/202
See application file for complete search history.

(56) References Cited

U.S. PATENT DOCUMENTS

| 6,072,480 | A  | * | 6/2000 | Gorbet | G06F 16/40 715/730 |
| 8,276,077 | B2 |   | 9/2012 | Segal et al. | |
| 8,281,245 | B1 | * | 10/2012 | Bennett | G06F 16/4393 715/732 |
| 8,826,117 | B1 | * | 9/2014 | Junee | G11B 27/034 715/230 |
| 8,875,014 | B2 | * | 10/2014 | Choi | G06F 16/48 715/241 |

(Continued)

OTHER PUBLICATIONS

Suchanek et al., Social Tags: Meaning and Suggestions, ACM 2008, pp. 223-232. (Year: 2008).*

(Continued)

*Primary Examiner* — Cong-Lac Huynh
(74) *Attorney, Agent, or Firm* — Michael Best & Friedrich LLP (57) ABSTRACT

A system for associating tags with a portion of a document and presenting portions of the document within a document authoring environment. In one instance, the system includes an input device, a display device, and an electronic processor. The electronic processor is configured to receive, via the input device, a first input, including a selection of the portion of the document and receive, via the input device, a second input including an indication of a first tag. The electronic processor is configured to associate the portion of the document with the first tag in response to receiving the second input. The electronic processor is also configured to receive, via the input device, a third input selecting the first tag or a second tag and in response to receiving the third input, display, within an authoring environment, portions of the document associated with the first tag or the second tag.

20 Claims, 10 Drawing Sheets

(56) References Cited

U.S. PATENT DOCUMENTS

| | | | |
|---|---|---|---|
| 9,026,915 B1* | 5/2015 | Ehlen | G06F 16/70 |
| | | | 715/728 |
| 9,354,779 B2* | 5/2016 | Maloney | G06F 17/211 |
| 10,146,800 B2* | 12/2018 | Nauerz | G06F 16/5866 |
| 2004/0201610 A1* | 10/2004 | Rosen | G06F 17/218 |
| | | | 715/731 |
| 2005/0027733 A1* | 2/2005 | Donahue | G06F 17/2264 |
| 2007/0277106 A1* | 11/2007 | Takriti | G06F 16/80 |
| | | | 715/723 |
| 2009/0210796 A1* | 8/2009 | Bhogal | G11B 27/034 |
| | | | 715/730 |
| 2009/0300547 A1* | 12/2009 | Bates | G06F 16/954 |
| | | | 715/825 |
| 2009/0313534 A1* | 12/2009 | Davis | G06Q 30/02 |
| | | | 715/202 |
| 2009/0327896 A1 | 12/2009 | Pall et al. | |
| 2010/0114991 A1 | 5/2010 | Chaudhary et al. | |
| 2011/0153768 A1 | 6/2011 | Carter et al. | |
| 2011/0173705 A1* | 7/2011 | Sundaram | G06F 21/6227 |
| | | | 726/28 |
| 2012/0191577 A1* | 7/2012 | Gonsalves | G06Q 30/0601 |
| | | | 705/27.2 |
| 2012/0198325 A1* | 8/2012 | Kief | G06F 17/2241 |
| | | | 715/234 |
| 2012/0221449 A1* | 8/2012 | Kief | G06F 16/958 |
| | | | 705/34 |
| 2014/0010520 A1* | 1/2014 | Bhatia | H04N 1/00933 |
| | | | 386/278 |
| 2014/0281850 A1 | 9/2014 | Prakash et al. | |
| 2015/0220882 A1* | 8/2015 | Flores | G06Q 10/103 |
| | | | 705/301 |
| 2016/0103854 A1 | 4/2016 | Nauerz et al. | |
| 2016/0124915 A1* | 5/2016 | Carro | G06F 9/543 |
| | | | 715/230 |
| 2016/0203386 A1* | 7/2016 | Porecki | G06K 9/00677 |
| | | | 382/159 |
| 2016/0321229 A1* | 11/2016 | Baird | G06F 17/241 |
| 2017/0133058 A1 | 5/2017 | Panchapakesan et al. | |
| 2018/0205797 A1* | 7/2018 | Faulkner | H04L 67/14 |
| 2019/0073384 A1* | 3/2019 | Nauerz | G06F 16/5866 |

OTHER PUBLICATIONS

Guerra et al., Supporting Image Search with Tag Clouds: A Preliminary Approach, ACM 2015, pp. 1-10. (Year: 2015).*

Oleksik et al., Lightweight Tagging Expands Information and Activity Management Preactices, ACM 2009, pp. 279-288. (Year: 2009).*

Han, et al., "WebSplitter: A Unified XML Framework for Multi-Device Collaborative Web Browsing", In Proceedings of Appeared in ACM Conference on Computer Supported Cooperative Work, Dec. 1, 2000, pp. 1-10.

Brandl, Kim, et al., "Tags Object( PowerPoint)", Retrieved from: https://docs.microsoft.com/en-us/office/vba/api/powerpoint.tags, Retrieved Date: Mar. 6, 2019, 2 Pages.

"International Search Report and Written Opinion Issued in PCT Application No. PCT/US19/013897", dated Mar. 19, 2019, 13 Pages.

Rindsberg, Steve, "Using Tags", Retrieved From: https://web.archive.org/web/20171112015118/http://www.pptfaq.com:80/FAQ00722_Using_Tags.htm, Retrieved Date: Mar. 6, 2019, 2 Pages.

* cited by examiner

SLIDE TAGGING AND FILTERING

BACKGROUND

Embodiments relate to systems and methods for organizing slides, documents, and similar items using tags.

Presentations may be created using, for example, Microsoft® PowerPoint presentation software. Other content, for example, a book with chapters may be created with other software, for example, Microsoft® Word word processing software.

SUMMARY

Organizing, grouping, and finding particular information within large presentations or "slide decks" is often difficult. It may similarly be difficult to organize, group, or find information when dealing with large word processing files. This is true even though there are existing tools to "find" words or group slides. For example, the "Sections" function in PowerPoint software allows slides to be grouped. A group or set of slides may be created within a presentation, and a user can expand or collapse sections of the presentation to filter the view. However, Sections cannot be used to group non-sequential sets of slides. For example, the user can only place slides "3-8" into a section and cannot place slides "3, 8, 9-12, and 14-19" into a section.

As a consequence, there is a need to provide a mechanism that allows for better grouping, organization, and searching of slides and similar content.

The embodiments described herein provide, among other things, a system and method for tagging portions of a document (for example, slides) within an authoring environment and filtering portions of the document based on the tags associated with the portions of the document. Among other things, embodiments save users time that would otherwise be spent searching through a document to find the portions of the document that are relevant to the task the user is performing. Filtering the portions of the document by tagging also decreases human error because the user is less likely to miss a portion of the document that is important to the task that the user performing. Tagging and filtering a document also improves the ability of users to collaboratively author. For example, if a group of users wants to divide a slide presentation so that each user is responsible for the content on a certain number of sequential or non-sequential slides, tagging each slide with the name of a person who is responsible for the content on each slide will help each user keep track of the slides that they are responsible for.

One embodiment also provides a system and method for automatically generating tag suggestions. In one example, tag suggestions are automatically generated based on content of a slide or metadata of a slide. In other embodiments, tag suggestions are also based on how slides (similar to the slides for which tag suggestions are being generated) have been tagged by users in the past.

Another embodiment provides a system for associating tags with a portion of a document and presenting portions of the document within a document authoring environment. The system includes an input device, a display device, and an electronic processor. The electronic processor is configured to receive, via the input device, a first input, including a selection of the portion of the document and to receive, via the input device, a second input including an indication of a first tag. The electronic processor is configured to associate the portion of the document with the first tag in response to receiving the second input. The electronic processor is also configured to receive, via the input device, a third input selecting the first tag or a second tag and in response to receiving the third input, the electronic processor is configured to display, within an authoring environment, portions of the document associated with the first tag or the second tag.

Another embodiment provides a method of associating tags with a slide and presenting slides within a presentation authoring environment. The method includes receiving a first input, via an input device, selecting the slide of a presentation file, where the slide includes a set of attributes. The method also includes receiving, via the input device, a second input including an indication of a first tag. The method also includes, in response to receiving the second input and with an electronic processor, associating the first tag with the slide by adding the first tag to the set of attributes of the slide or adding the first tag to the presentation file. The method further includes receiving, via the input device, a third input selecting the first tag or a second tag and in response to receiving the third input, displaying, via a display device, slides associated with the first tag or the second tag.

Yet another embodiment provides a non-transitory computer readable storage medium including instructions that, when executed by an electronic processor, cause the electronic processor to execute a set of functions. The set of functions include receiving a first input, via an input device, selecting the slide of a presentation file, the slide including a set of attributes and receiving, via the input device, a second input including an indication of a first tag. The set of functions also includes, in response to receiving the second input and with the electronic processor, associating the first tag with the slide by adding the first tag to the set of attributes of the slide or adding the first tag to the presentation file. The set of functions further includes receiving, via the input device, a third input selecting the first tag or a second tag and, in response to receiving the third input, displaying, via a display device, slides disassociated with the first tag or the second tag.

Other aspects, features, and embodiments will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or a combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions. For example, with respect to receiving inputs, first and second inputs do not necessarily connote a specific sequence in time with respect to when the inputs are received.

Figure 1:
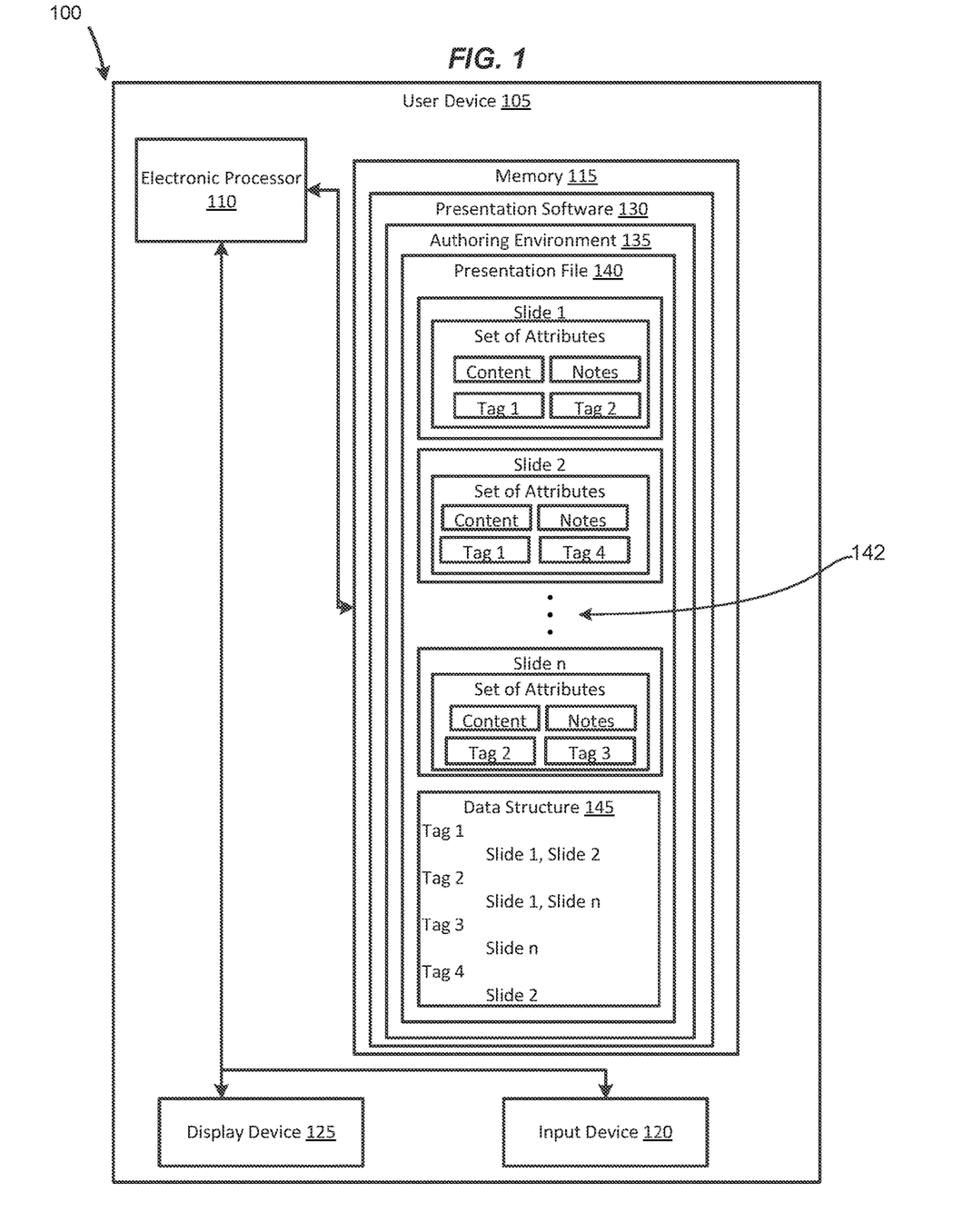
FIG. 1 is a diagram of a system for associating tags with slides and presenting the slides within a presentation authoring environment.

FIG. 1 is a diagram of an example embodiment of a system 100 for associating tags with a slide and presenting slides within a presentation authoring environment. Although the illustrated system is described with respect to slides and presentation software, for example, Microsoft® PowerPoint software, it should be understood that principles described herein may be applied to document creation and editing software including, for example, Microsoft® Word, and Microsoft® Excel. It should also be understood that tags may be associated with and used to filter portions of documents including pages, paragraphs, sheets, columns, rows, or cells. In addition, the system 100 may include additional or fewer components in configurations different from the configuration illustrated in FIG. 1.

The system 100 includes a user device 105. The user device 105 may be a laptop or desktop computer, a tablet computer, smart phone, or other computing device. The user device 105 includes an electronic processor 110, a memory 115, an input device 120, and a display device 125. The electronic processor 110, memory 115, input device 120, and display device 125 communicate over one or more communication lines or buses, wireless connections, or a combination thereof. It should be understood that, in various configurations, user device 105 may include additional or alternative components than those illustrated in FIG. 1 and may perform additional functions than the functions described herein. For example, although only the input device 120 is shown, in some embodiments, the user device 105 includes multiple input devices, for example, a keypad, a mouse, a touchscreen (for example, as part of the display device 125), a microphone, a camera, or the like (not shown).

The electronic processor 110 may include one or more electronic processors (for example, microprocessors), application-specific integrated circuits (ASICs), or other suitable electronic devices. The memory 115 includes a non-transitory computer readable medium, for example, one or more of the types of memory noted above.

The electronic processor 110 is electrically connected to and executes instructions stored in the memory 115. In the example illustrated in FIG. 1, the memory 115 stores presentation software 130. The presentation software 130 is configured to create an authoring environment 135 (or presentation authoring environment), for example, for creating, editing, and displaying presentation documents. A presentation document is stored within a presentation file 140 and is a digital document that may include text data, image data, video data, and audio data. A presentation document contains a plurality of slides. In the example illustrated Slide 1, Slide 2, and Slide n are shown as being stored in the presentation file 140. Slide n represents the last file that is stored in the presentation file 140 and three ellipses or vertical dots 142 represent the slides in the presentation file 140 that come after Slide 2 and before Slide n. It should be understood that the number of slides contained in the presentation file 140 is limited only by system constraints. In some embodiments, each slide of the plurality of slides has a set of attributes and each slide's set of attributes contain a plurality of tags, content of the slide, and notes associated with the slide. For example, in the embodiment illustrated, Slide 1 of the presentation file 140 includes Tag 1 and Tag 2 in its set of attributes and Slide 2 includes Tag 1 and Tag 4 in its set of attributes. In other embodiments, tags are not stored in a slide's set of attributes. Instead, each tag is stored in a data structure 145 (for example, a hash table) in the presentation file 140 along with the one or more slides in the presentation file 140 the tag is associated with.

If the electronic processor 110 creates a copy of the presentation file 140, the copy of the presentation file 140 will include the same slides and tags as the presentation file 140. The tags in the copy of the presentation file 140 will be associated with the same slides that the tags in the presentation file 140 are associated with. Additionally, if a copy of a slide, for example, Slide 1, is created within the presentation file 140, then the copy of the slide is associated with the same tags associated with the original slide. For example, if the electronic processor 110 creates a copy of Slide 1 then the copy of Slide 1 will be associated with Tag 1 and Tag 2.

The electronic processor 110 is operable to receive input from a user via the input device 120 to create and edit presentation documents via the presentation software 130, and is operable to output presentation documents generated via the presentation software 130, for example, via the display device 125 and other output devices. The electronic processor 110 is also operable to receive input from a user via the input device 120 to add a tag to, remove a tag from, and edit a tag and is operable to receive a selection of a plurality of tags and display the slides contained within the presentation file 140 based on the selected tags.

Figure 2:
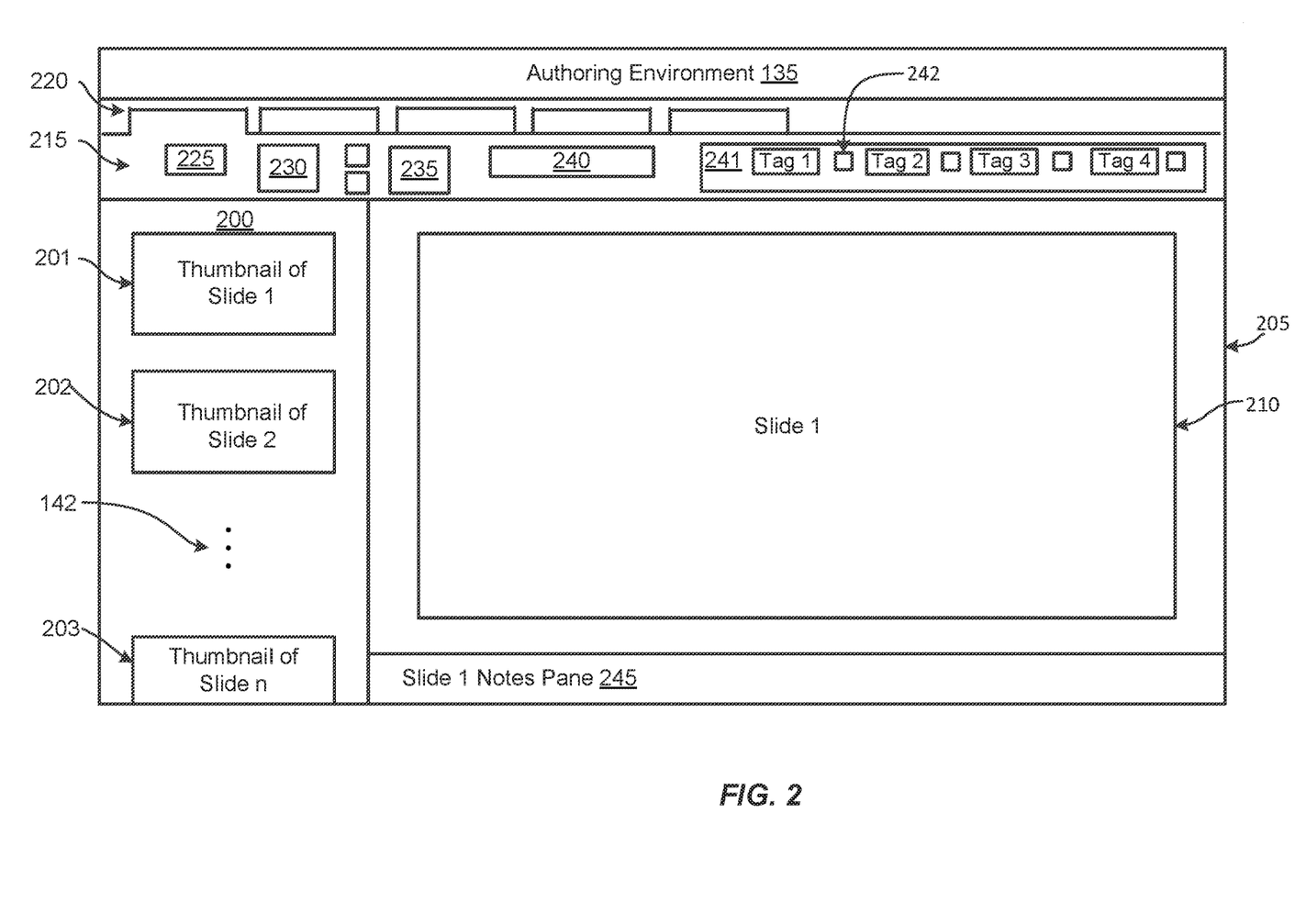
FIG. 2 is an illustration of a presentation file displayed within an authoring environment on a display device.

FIG. 2 is a diagram of the presentation file 140 displayed on the display device 125 in a graphical user interface (GUI) of the authoring environment 135. In the example shown, the GUI of the authoring environment 135 includes a pane 200 displaying a set of thumbnails (201, 202, 203). A thumbnail is a visual representation of a slide (or, more broadly, a portion of a document) and the set of thumbnails (or, more broadly, set of visual representations) includes a thumbnail for each slide included in the presentation file 140. Only a portion of the set of thumbnails may be displayed in the pane 200 at one time depending on the number of slides included in the presentation file 140. Upon receiving input from the user, the electronic processor 110 updates the portion of the set of thumbnails that is displayed in the pane 200. For example, if the user scrolls with a mouse, the electronic processor 110 causes a different portion of the set of thumbnails to be displayed in the pane 200. The authoring environment 135 also includes an editing pane 205 that displays a slide 210 that the user is currently editing, and a ribbon 215. The ribbon 215 contains a plurality of tabs. Each tab contains a plurality of buttons that, when selected, cause the electronic processor 110 to edit the slides and alter how the slides included in the presentation file 140 are displayed in the GUI of the authoring environment 135. For example, tab 220 contains a plurality of buttons (225, 230, 235, 240) that cause the electronic processor 110 to tag and filter slides. The tab 220 also contains a list of tags 241 that are included in the presentation file 140. A checkbox 242 is displayed next to each tag in the list of tags 241 in the GUI of the authoring environment 135. The authoring environment 135 also includes a notes pane 245 that displays notes associated with, but not displayed on, the slide 210.

It should be understood that the example GUI is described and illustrated as having certain panes, tabs, ribbons, menus, buttons, checkboxes, and other components to help facilitate understanding. However, other components and configurations are possible than those illustrated. Panes could be rearranged and located differently than shown. Alternative GUI components for accepting input from and providing output to a user could also be utilized. With respect to, for example, components described as being used to make selections, GUI components other than buttons and checkboxes could be used.

Figure 3:
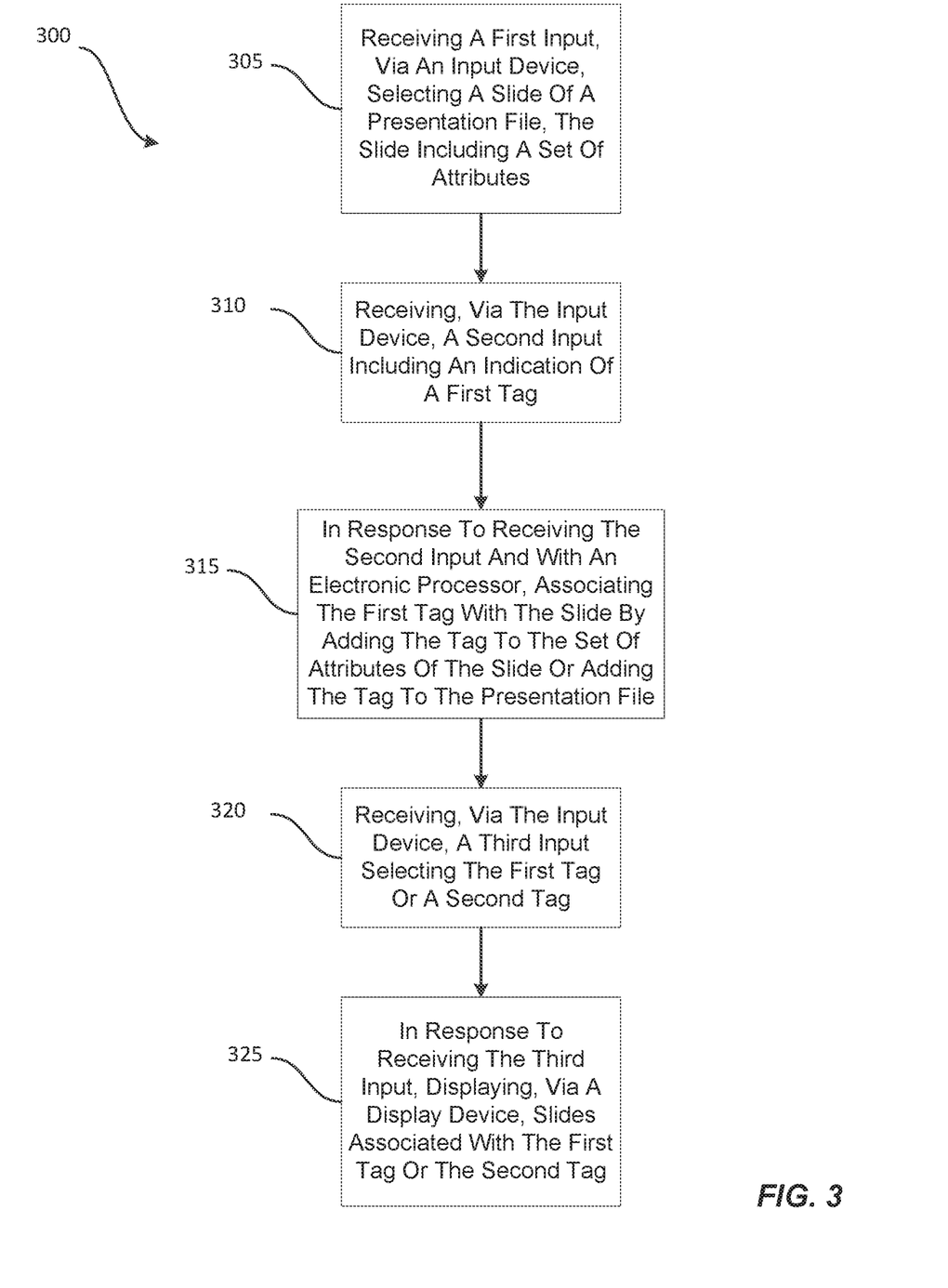
FIG. 3 is a flow chart of a method for associating tags with a slide and presenting slides within an authoring environment using the system of FIG. 1.

FIG. 3 is a flow chart of an example method 300 for associating tags with a slide and presenting slides within an authoring environment. The electronic processor 110 executes the presentation software 130 creating an authoring environment 135 for a presentation document within a presentation file 140. The electronic processor 110 receives from the input device 120 a selection of a slide (a first input) within the presentation file 140 (block 305). The electronic processor 110 also receives a second input including an indication of a first tag (block 310). It should be understood that, in some embodiments, the electronic processor 110 receives the indication of the first tag before receiving the selection of the slide. In response to receiving the selection of a slide and the indication of the first tag the electronic processor 110 associates the first tag with the selected slide (block 315). Upon receiving a third input from the input device 120 that includes a selection of the first tag or of a second tag (block 320), the electronic processor 110 displays the slides associated with the first tag or the second tag (block 325). In some embodiments, the electronic processor 110 receives a fourth input including a selection of a third tag. Upon receiving the selection of the third tag the electronic processor 110 displays the slides associated with the third tag and the first tag or the second tag. Each step of the method 300 presented above is described in more detail below.

Depending on input received from a user, the electronic processor 110 associates a tag with a slide, disassociates a tag from a slide, and edits a tag associated with the slide. It should be understood that while certain embodiments described herein describe receiving input from the user as, for example, receiving a signal from a cursor-control device that a right-click is performed, receiving input from the user may include receiving input in the form of, for example, a key press, a voice command, or a touch-screen selection. It should also be understood that the operations described below may be performed when the electronic processor 110 receives a selection of, for example, a button of the tab 220 rather than a selection of a menu entry of a context menu as is described below.

Figure 4:
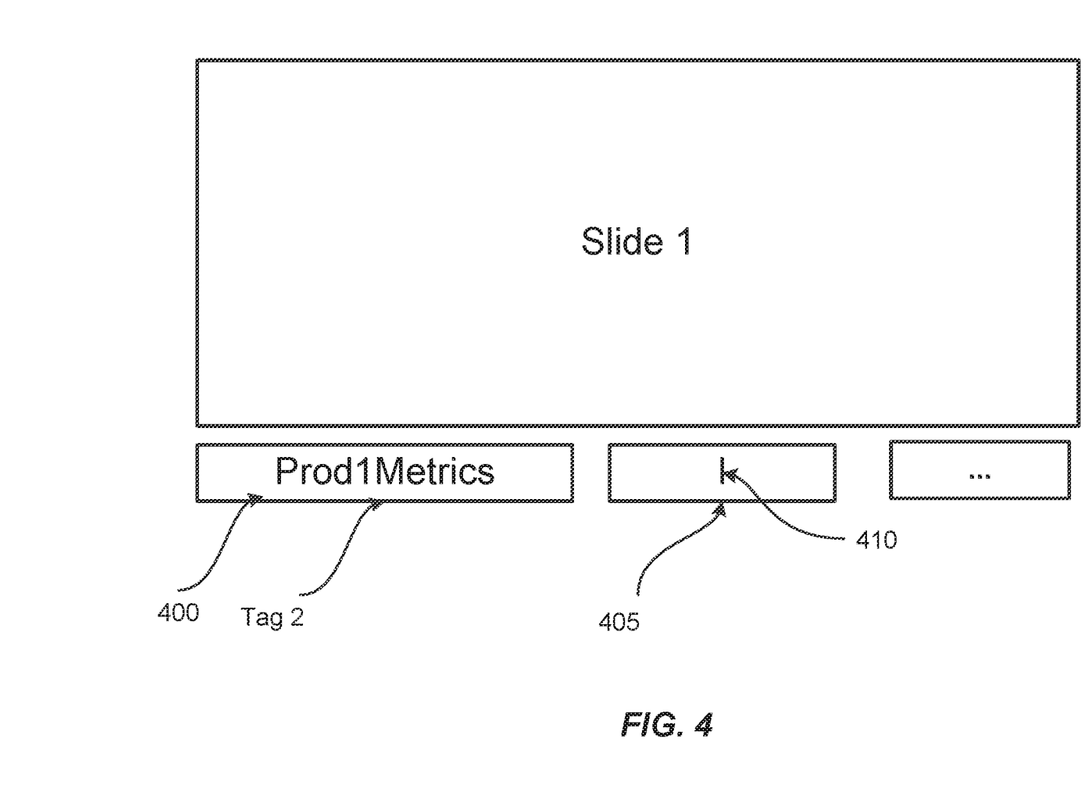
FIG. 4 is a diagram of a tag being associated with a slide.

Returning to FIG. 2, if a user right clicks on the thumbnail of Slide 1, a context menu is displayed on the display device 125. The menu includes a menu entry that allows a user to associate a tag with Slide 1, for example, add a tag to the set of attributes of Slide 1. FIG. 4 is a diagram illustrating, in a graphical user interface, the first tag (Tag 1 of FIG. 1) being associated with Slide 1. As shown in FIG. 4, Slide 1 already has the second tag (Tag 2 of FIG. 1), entitled Prod1Metrics displayed in a textbox 400. The electronic processor 110 displays a text box 405 containing a text cursor 410 as a result of the selection of the option to associate a tag with Slide 1. If, for example, the user types the word "Sales" into the text box 405 then the first tag (Tag 1 of FIG. 1), entitled "Sales" is associated with Slide 1.

In some embodiments, the electronic processor 110 adds a tag to a slide upon receiving input from the user that adds a string of characters to the notes pane 245. For example, if the string is added to the notes pane 245 and includes a symbol (for example, a hashtag) followed by text of the tag, the slide is associated with a tag defined by the text of the tag added to the notes pane 245. For example, if the string added to the notes pane 245 of Slide 1 is "# Sales" the tag "Sales" is associated with Slide 1.

In some embodiments, the electronic processor 110 automatically generates and displays a plurality of tag suggestions for a selected slide. The tag suggestions depend on the slide that the user has selected to associate a tag with. In other embodiments, tag suggestions are generated for each slide in the presentation file 140. In some implementations, the plurality of tag suggestions is generated by the electronic processor 110 analyzing the content of a slide. For example, the electronic processor 110 executes a content analyzer to analyze, for example, text, images, video, and other content of a slide. Based on the analyzed content, the electronic processor 110 determines words and phrases that describe the slide content. For example, if the content analyzer determines that the slide is about birds the electronic processor 110 generates the word "birds" as a tag suggestion. In another example, if the content analyzer determines there to be a number of spelling mistakes in the slide content the electronic processor 110 generates a tag suggestion with the word "spelling." In other implementations, the plurality of tag suggestions is generated by the electronic processor 110 analyzing metadata associated with a slide. For example, the electronic processor 110 executes a metadata analyzer to analyze the metadata that is available to the electronic processor 110. The metadata available to the electronic processor 110 is, for example, the author of the slide and the date and time of the creation of the slide. Based on the analyzed metadata, the electronic processor 110 determines, for example, words and phrases relevant to the slide. For example, if the metadata analyzer determines that the author of the slide is "David" the electronic processor 110 generates the word "David" as a tag suggestion for the slide.

In yet other implementations, tag suggestions generated by the electronic processor 110 are based on analyzing tags that other users have associated with slides similar to the slide for which the tag suggestion is being generated. For example, the content analyzer may determine that a slide is described by the word "pets." The electronic processor 110 then analyzes historical activity. For example, the electronic processor determines that a certain percentage of users tag slides with the phrase "cats and dogs" when those slides are identified by the content analyzer as being described by the word "pets." When the percentage of users reaches a predetermined threshold, the electronic processor 110 generates a tag suggestion of "cats and dogs." When the electronic processor 110 receives input that a user selects a tag from the tag suggestions, the electronic processor 110 adds the selected tag to the slide.

In some embodiments, the electronic processor 110 determines a rule to use to automatically tag slides. For example, if the electronic processor 110 receives input from a user that each slide in the presentation file 140 is to be associated with a tag that includes the name of the author of the slide, the electronic processor 110 develops a rule that when a new slide is created, a tag including the name of the author of the slide is generated and associated with the slide. Tags generated by the electronic processor 110 based on rules are associated with the slide regardless of whether the electronic processor 110 receives a selection of the tag. In some embodiments, the tags generated based on rules are not displayed in the pane 200, but electronic processor 110 is able to use the tags to filter the slides included in the presentation file 140.

Figure 5:
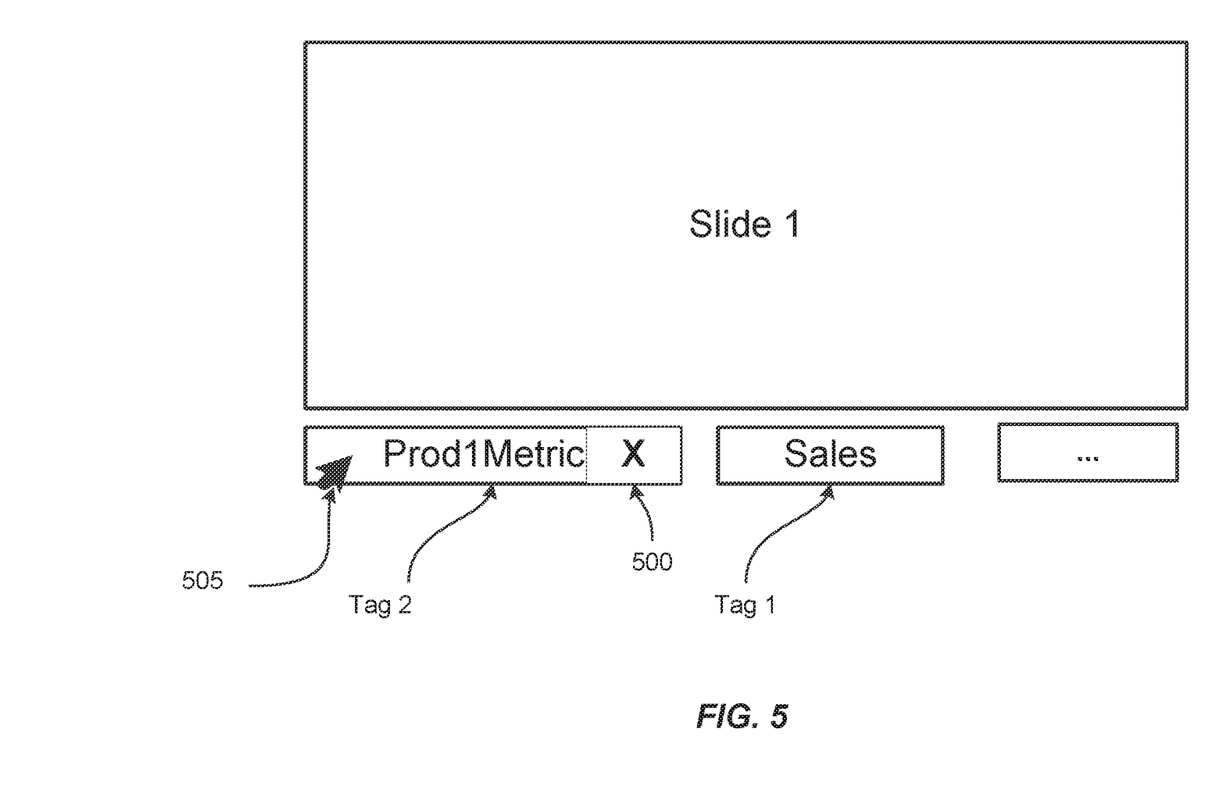
FIG. 5 is a diagram of a tag being disassociated from a slide.

As shown in FIG. 5, tags may be dissociated from slides. In the example shown, if a user places a cursor 505 over a tag, a delete tag icon 500 is generated by the electronic processor 110 and appears covering part of the tag. In FIG. 5, the user has placed the cursor 505 on the second tag entitled "Prod1Metrics." Therefore, the delete tag icon 500 is displayed, by the electronic processor 110, above the second tag in the GUI of the authoring environment 135. When the electronic processor 110 receives a selection of the delete tag icon 500, the electronic processor 110 disassociates the Prod1Metrics tag from Slide 1. When a user right clicks on a tag, the electronic processor 110 causes a context menu to be displayed. The context menu includes a delete tag menu entry. When the delete tag menu entry is selected from the context menu, the electronic processor 110 removes the tag from Slide 1.

Figure 6:
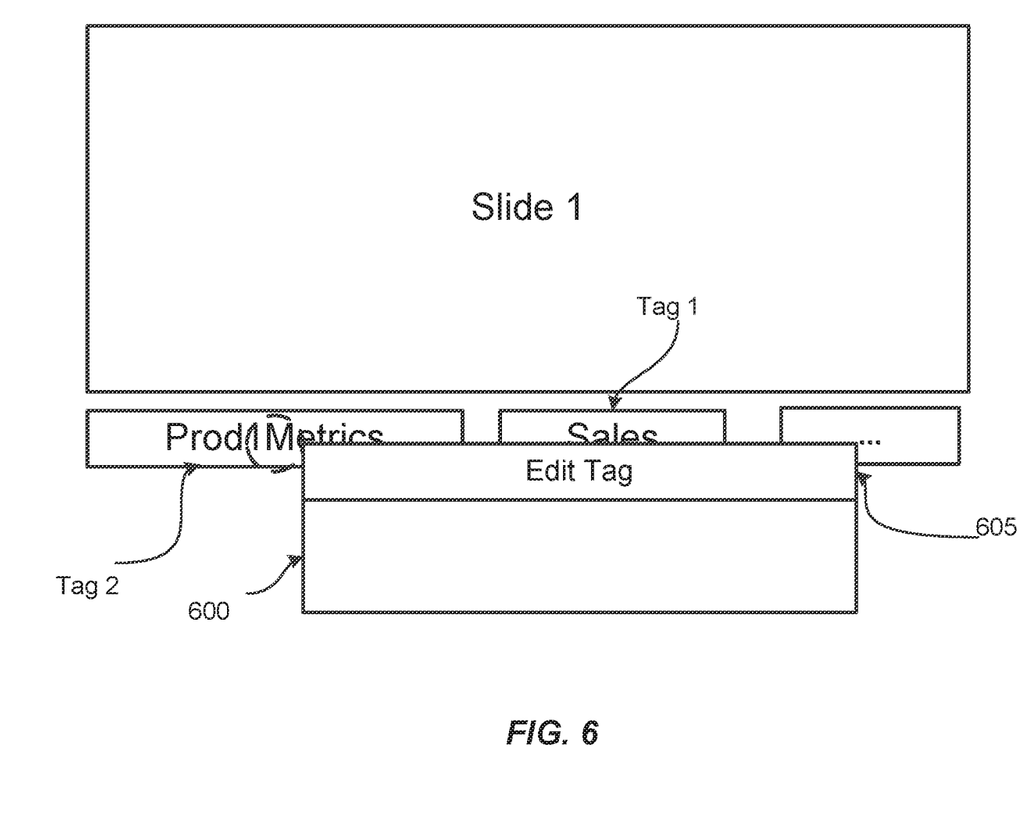
FIG. 6 is a diagram of a tag associated with a slide being edited.

As mentioned above, tags in the presentation file 140 are editable. In some embodiments, to edit a tag associated with a slide, a user right clicks a tag. In other embodiments, other selections are used. For example, a double click on a tag or may cause editing functionality to be initiated. Upon receiving a signal from the input device 120 that the user has performed selected a tag, the electronic processor 110 causes a context menu 600 including an edit tag menu entry 605 to be displayed. In the example shown in FIG. 6, a user right clicks the second tag. When the electronic processor 110 receives a selection, from the input device 120, of the edit tag menu entry 605 from the context menu 600, the electronic processor 110 allows the user to edit, in this case, rename, the second tag, entitled "Prod1Metrics" by, for example, typing in a new name.

The electronic processor 110 is not limited to associating, disassociating, or editing one tag at a time. In some embodiments, the ribbon 215 includes the tab 220 that, as described above, contains a plurality of buttons (225, 230, 235, 240) which cause the electronic processor 110 to tag and filter slides. The tab 220 includes a button 225 that when selected causes the electronic processor 110 to add a tag associated with one slide (one portion of a document) to multiple selected other slides (multiple selected other portions of a document) simultaneously. The tab 220 also includes a button 230 that when selected causes the electronic processor 110 to associate a new tag with multiple selected slides (multiple selected portions of a document) simultaneously. The tab 220 includes a button 235 that when selected causes the electronic processor 110 to disassociate from a slide, every tag associated with the slide. The tab 220 includes a button 240 that when selected causes the electronic processor 110 to disassociate a tag from each slide that it is associated with, effectively removing the tag from the presentation file 140. It should be understood that the multiple selected slides and multiple selected other slides described above may or may not be sequential slides.

Figure 7:
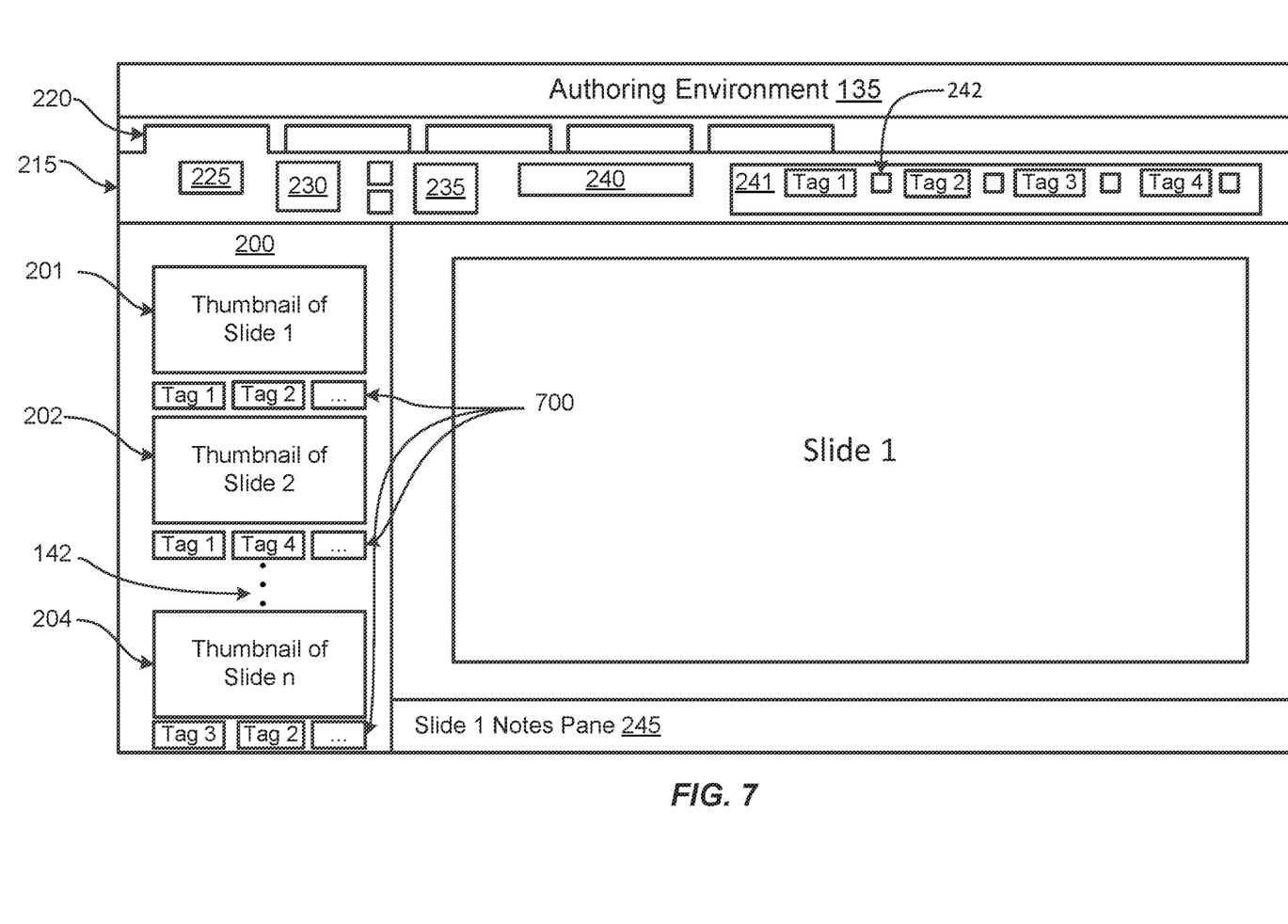
FIG. 7 is an illustration of a presentation file displayed within an authoring environment on a display device, where slides included in the presentation file have tags associated with them.

As tags are added, deleted, and edited, the view of the presentation file 140 in the GUI of the authoring environment 135 is updated. FIG. 7 shows that the tags that are associated with each slide in the presentation file 140 are displayed below the thumbnail representations of the slides that the tags are associated with. For example, Tag 2 is associated with Slide 1 and Slide n. Therefore, in FIG. 7, Tag 2 is displayed below Slide 1 and Slide n. In some embodiments, depending on the number of tags associated with a slide, it may not be possible or desirable to display all of the tags associated with the slide below the thumbnail representation of the slide. For example, the restrictions on screen space for the pane 200 make it impossible to display all of the tags associated with a slide below the thumbnail representation of the slide at a size where the user is able to read the tags. Clicking on a button 700 causes the electronic processor 110 to generate, for display below the thumbnail representation of the slide, the tags associated with the slide that are not automatically displayed.

Figure 8:
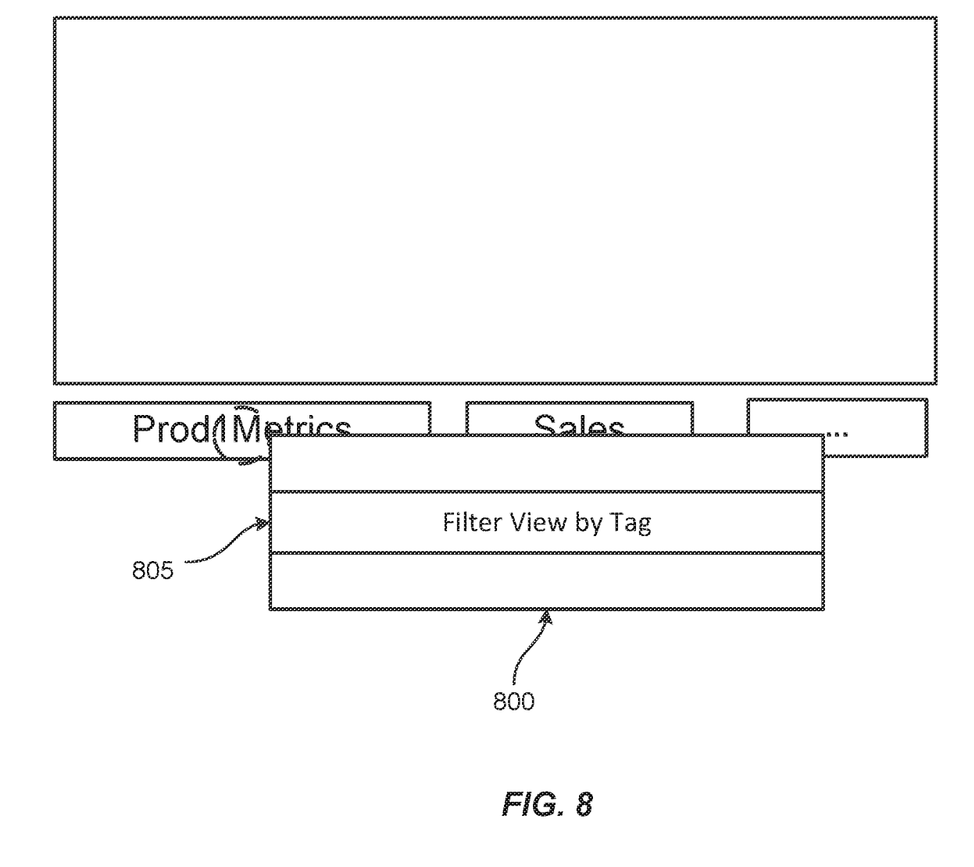
FIG. 8 is a diagram of a filtering selection mechanism.

Once at least one tag has been added to at least one slide, the slides in the presentation file 140 are able to be filtered by the tags that they are associated with FIG. 8 shows the selection of a tag to filter the view of the slides. In some embodiments, the user is able to select a tag to use to filter the slides by right clicking on the tag. Right clicking on the tag causes the electronic processor 110 to generate for display on the display device 125 a context menu 800 including a menu entry 805. Selecting the menu entry 805 causes the electronic processor 110 to filter the slides with the tag that the user right clicked. In FIG. 8 the user has selected to filter the slides in the presentation file 140 using the Prod1Metrics tag.

Figure 9:
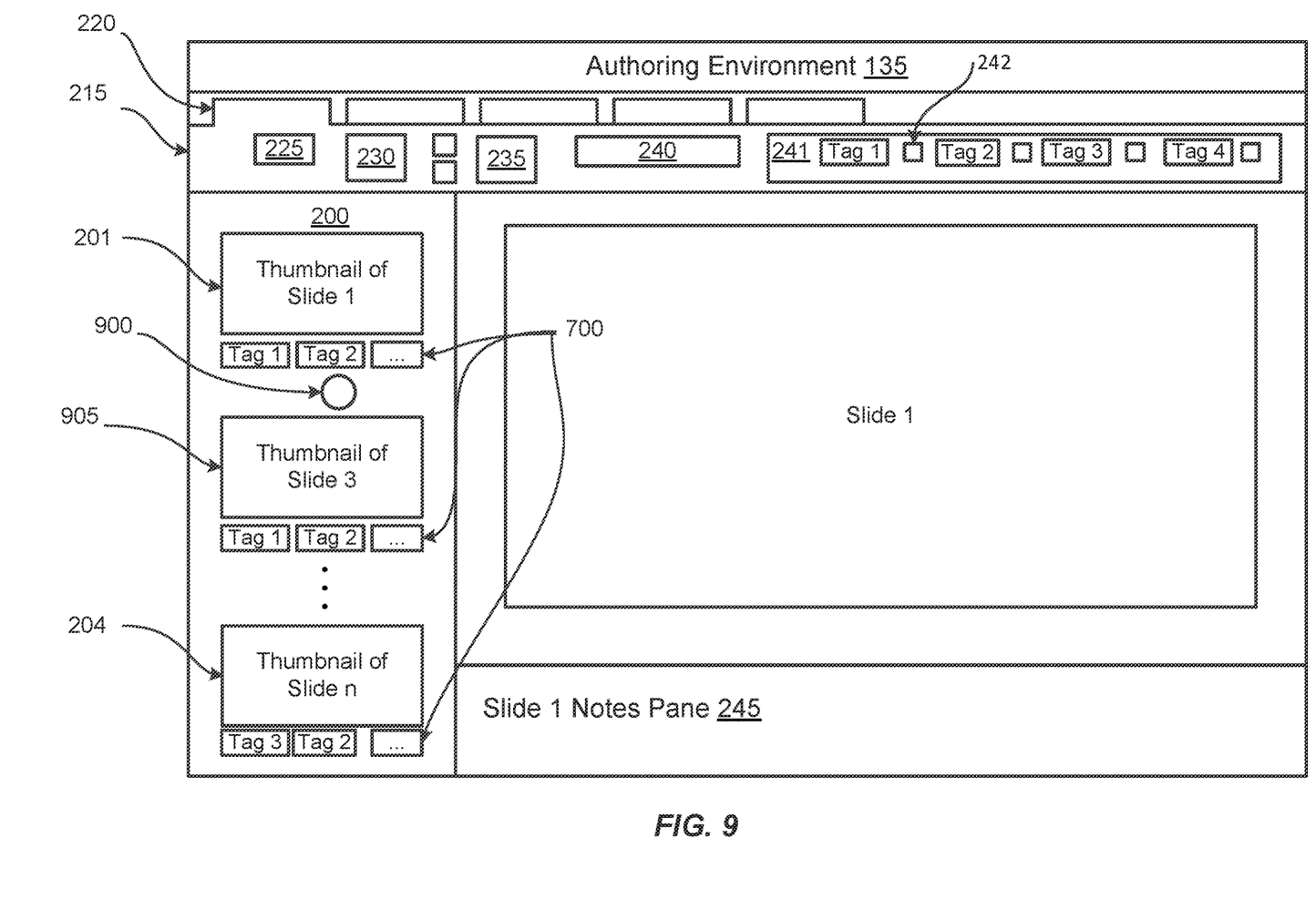
FIG. 9 is an illustration of a presentation file displayed within an authoring environment on a display device, where a filter has been applied to the presentation file.
Figure 10:
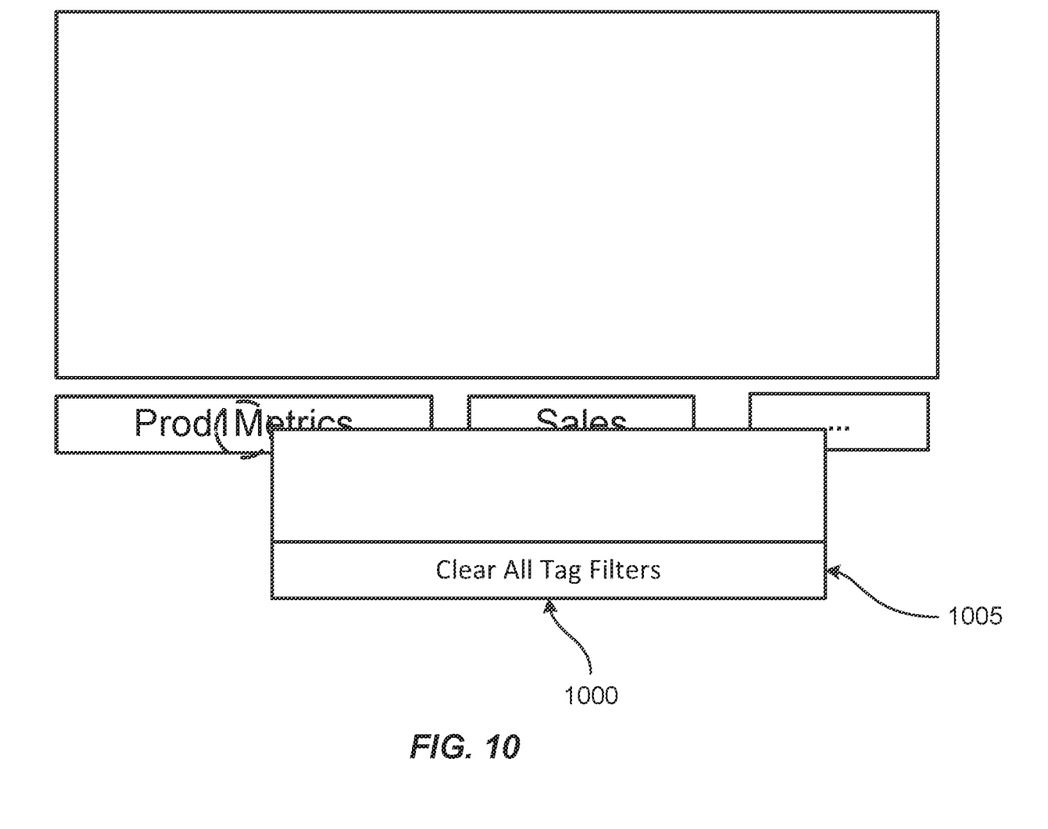
FIG. 10 is a diagram of a clearing mechanism to clear or remove filters that have been applied to a presentation file.

FIG. 9 is an example of a view of the presentation file 140 that is displayed within the authoring environment 135 when the electronic processor 110 receives a selection of a tag to filter the slides in the presentation file 140 with. In FIG. 9 the slides have been filtered by Tag 2, entitled Prod1Metrics. Therefore, the thumbnails representing the slides associated with Tag 2 are displayed within the pane 200 and the thumbnails representing slides that are not associated with Tag 2 are removed from display in pane 200. Alternatively, in some embodiments, when the electronic processor 110 receives the selection of Tag 2 as the tag to use to filter the slides, only the thumbnails of the slides not associated with Tag 2 are displayed within the pane 200. The thumbnails are displayed in the pane 200 according to an order defined in the presentation file 140 for the slides that each thumbnail represents. If a thumbnail or a group of thumbnails is removed from display in the pane 200 due to the application of a filter, then a button 900 is displayed in locations where the removed thumbnail or group of thumbnails (or removed visual representation or group of visual representations) would normally be displayed. The button 900 indicates the locations of the removed thumbnails or group of thumbnails in the pane 200. For example, the button 900 is displayed between the thumbnail 201 of Slide 1 and a thumbnail 905 of Slide 3 because the thumbnail 202 of Slide 2 was removed from the set of thumbnails displayed in the GUI of the authoring environment 135. The thumbnail of Slide 2 was removed from the set of thumbnails displayed in the GUI of the authoring environment 135 because Slide 2 is not associated with Tag 2. Selecting the button 900 causes the electronic processor 110 to remove the one or more filters that have been applied to the presentation file 140 and to display the thumbnails of each slide included in the presentation file 140 within the pane 200, although the thumbnails may not all be displayed in the pane 200 at once. In some instances (not shown in FIG. 9), no indication of the location where a slide or a group of slides has been removed from the pane 200 is displayed because the thumbnails in the pane 200 are numbered. For example, if thumbnails numbered 1-3 and 6-7 are displayed within the pane 200, a user is able to infer that slides 3 and 4 have been removed from the set of thumbnails displayed within the pane 200. In another implementation (also not shown in FIG. 9), a graphical icon is displayed where a slide or a group of slides were removed from the pane 200. In some embodiments, for example those illustrated in FIG. 10, the electronic processor 110 removes all of the filters that have been applied to a presentation file 140 when the user right clicks on a thumbnail, causing a context menu 1000 to be displayed. The context menu 1000 includes a menu entry 1005 that upon selection causes the electronic processor 110 to remove all tag filters.

As mentioned above, a selected tag may be used to filter slides (or documents) from the authoring environment. Filtering may be performed depending on whether slides are or are not associated with the selected tag. In other words, a "filter by" or "filter from" operation may be performed. In some embodiments, when the electronic processor 110 receives a selection of a tag, the electronic processor 110 also receives an indication, for each selected tag, to remove slides that are not associated (or disassociated) with the selected tag(s) from the pane 200 (a "filter by" operation). Alternatively, the electronic processor 110 receives an indication, for each selected tag, to remove slides that are associated with the selected tag(s) from the pane 200 (a "filter from" operation. In some embodiments, the electronic processor 110 receives a "filter from" indication or a "filter by" indication when a user selects a checkbox. In one example, a checkbox (for example, checkbox 242) is displayed in the GUI of the authoring environment 135 next to each tag displayed in the list of tags 241 included in the tab 220. Continuing the example, if the user selects the checkbox 242 once, a green check is displayed within the checkbox 242 signaling to the user that the electronic processor 110 has received a selection of the tag (Tag 1) and a "filter by" indication for the selected tag. If the user clicks on the checkbox 242 again, a red x is displayed within the checkbox 242, signaling to the user that the electronic processor 110 has received a selection of the tag (Tag 1) and a "filter from" indication for the selected tag. If the user clicks on the checkbox 242 a third time, nothing is displayed within the checkbox 242, signaling to the user that no selection has been received by the electronic processor 110.

In some embodiments, the electronic processor 110 is configured to receive a selection of multiple tags to filter slides with. The electronic processor 110 is configured to receive, along with the selection of multiple tags, a selection of AND functionality (an "AND function") or a selection of OR functionality (an "OR function"). If the electronic processor 110 receives an AND function, the electronic processor 110 removes, from the pane 200, thumbnails of slides that do not meet criteria established by each selection and indication received by the electronic processor 110. For example, if the electronic processor 110 receives an AND function, a selection of the tag Prod1Metrics, a "filter by" indication for the tag Prod1Metrics, a selection of the tag Sales, and a "filter from" indication for the tag Sales, the electronic processor 110 displays, in the pane 200, thumbnails of slides that are not associated with the tag Sales and are associated with the tag Prod1Meterics. If an OR function is received, the electronic processor 110 removes, from the pane 200, thumbnails of slides that do not meet criteria established by at least one selection and indication received by the electronic processor 110. For example, if the electronic processor 110 receives an OR function, a selection of the tag Prod1Metrics, a "filter by" indication for the tag Prod1Metrics, a selection of the tag Sales, and a "filter from" indication for the tag Sales, the electronic processor 110 displays, in the pane 200, thumbnails of slides that are not associated with the tag Sales or are associated with the tag Prod1Meterics.

Thus, the embodiments described herein provide, among other things, a system and method for associating tags with a slide and presenting slides within a presentation authoring environment. Various features and advantages of various embodiments are set forth in the following claims.

What is claimed is:

1. A system for presenting one or more portions of a document associated with one or more tags within a document authoring environment, the system comprising:
   an input device;
   a display device; and
   an electronic processor configured to;
      receive, via the input device, a selection of a first tag, a second tag, and one from the group consisting of a Boolean AND function and a Boolean OR function;
      when the Boolean AND function is selected, display, within an authoring environment, one or more portions of the document associated with the first tag and the second tag; and when the Boolean OR function is selected, display, within the authoring environment, one or more portions of the document associated with the first tag, the second tag, or both.

2. The system according to claim 1, wherein the first tag and the second tag are editable.

3. The system according to claim 1, wherein the electronic processor is further configured to receive a selection of multiple portions of the document and associate the multiple portions of the document with the first tag.

4. The system according to claim 1, wherein the electronic processor is further configured to receive a selection of the second tag and a portion of the document that the second tag is associated with and, in response to receiving the selection of the second tag, disassociate the second tag from the portion of the document.

5. The system according to claim 1, wherein portions of the document are displayed as a set of visual representations and the electronic processor is configured to
display each portion of the document;
when the Boolean AND function is selected, display, within an authoring environment, one or more portions of the document associated with the first tag and the second tag by removing, from the set of visual representations, visual representations of portions of the document not associated with the first tag and the second tag;
when the Boolean OR function is selected, display, within an authoring environment, one or more portions of the document associated with the first tag, the second tag, or both by removing, from the set of visual representations, visual representations of portions of the document not associated with the first tag, the second tag, or both.

6. The system according to claim 5, wherein the set of visual representations are displayed according to an order portions of the document appear in the document and a location of a removed visual representation is indicated by a button displayed at the location.

7. The system according to claim 6, the electronic processor is further configured to receive a selection of the button and, in response to receiving the selection of the button, display the removed visual representation.

8. A method for presenting one or more slides associated with one or more tags within a presentation authoring environment, the method comprising:
receiving, via an input device, a selection of a first tag, a second tag, and one from the group consisting of a Boolean AND function and a Boolean OR function;
when the Boolean AND function is selected, displaying, within the presentation authoring environment, one or more slides associated with the first tag and the second tag; and
when the Boolean OR function is selected, displaying, within the presentation authoring environment, one or more slides associated with the first tag, the second tag, or both.

9. The method according to claim 8, the method further comprising
receiving, via the input device, a selection of a slide of a presentation file;
receiving, via the input device, a selection of the first tag;
in response to receiving the selection of the first tag, associating the first tag with the slide;
wherein receiving a selection of the first tag includes automatically generating tag suggestions and receiving a selection of a tag suggestion as the first tag.

10. The method according to claim 9, wherein automatically generating tag suggestions includes analyzing content of the slide.

11. The method according to claim 9, wherein automatically generating tag suggestions includes analyzing metadata of the slide.

12. The method according to claim 9, wherein automatically generating tag suggestions includes analyzing tags associated with slides having content similar to the content of the slide.

13. The method according to claim 8, wherein slides are displayed as a set of thumbnails and the method further comprising
displaying each slide included in a presentation file;
when the Boolean AND function is selected, removing, from the displayed set of thumbnails, thumbnails representing slides not associated with the first tag and the second tag; and
when the Boolean OR function is selected, removing, from the displayed set of thumbnails, thumbnails representing slides not associated with the first tag, the second tag, or both.

14. The method according to claim 8, the method further comprising
receiving, via the input device, a selection of a third tag and one from the group of consisting of a second Boolean AND function and a second Boolean OR function.

15. The method according to claim 8, wherein slides are displayed as thumbnails and, below the thumbnail of each slide, tags associated with the slide are displayed.

16. A non-transitory computer readable medium including instructions that, when executed by an electronic processor, cause the electronic processor to execute a set of functions, the set of functions comprising:
receiving, via a input device, a selection of a first tag, a second tag, and one from the group of consisting of a Boolean AND function and a Boolean OR function;
when the Boolean AND function is selected, displaying, via a display device, one or more slides associated with both the first tag and the second tag; and
when the Boolean OR function is selected, displaying, via the display device, one or more slides associated with the first tag, the second tag, or both.

17. The non-transitory computer-readable medium according to claim 16, wherein slides are displayed as a set of thumbnails and the set of functions further comprising
displaying each slide included in a presentation file;
when the Boolean AND function is selected, removing, from the displayed set of thumbnails, thumbnails representing slides not associated with the first tag and the second tag; and
when the Boolean OR function is selected, removing, from the displayed set of thumbnails, thumbnails representing slides not associated with the first tag, the second tag, or both.

18. The non-transitory computer-readable medium according to claim 17, wherein displaying slides as a set of thumbnails includes displaying the thumbnails according to an order of slides defined in the presentation file and a location of a removed thumbnail is indicated by a button displayed at the location in the set of thumbnails.

19. The non-transitory computer-readable medium according to claim 18, the set of functions further comprising receiving a selection of the button and, in response to receiving the selection of the button, displaying the removed thumbnails.

20. The non-transitory computer-readable medium according to claim 16, the set of functions further comprising
 receiving, via the input device, a selection of a slide of a presentation file;
 receiving, via the input device, a selection of the first tag;
 in response to receiving the selection of the first tag, associating the first tag with the slide.

* * * * *